(12) United States Patent
Lohmann

(10) Patent No.: US 7,574,992 B2
(45) Date of Patent: Aug. 18, 2009

(54) FUEL INJECTOR WITH MULTIPLE INJECTOR NOZZLES FOR AN INTERNAL COMBUSTION ENGINE

(75) Inventor: Craig William Lohmann, Denver, IA (US)

(73) Assignee: Deere & Company, Moline, IL (US)

( * ) Notice: Subject to any disclaimer, the term of this patent is extended or adjusted under 35 U.S.C. 154(b) by 99 days.

(21) Appl. No.: 11/654,202

(22) Filed: Jan. 16, 2007

(65) Prior Publication Data
US 2008/0169365 A1    Jul. 17, 2008

(51) Int. Cl.
*F02B 3/02* (2006.01)
*F02B 3/00* (2006.01)

(52) U.S. Cl. .......................... 123/299; 123/300

(58) Field of Classification Search ................. 123/299, 123/300, 305, 478, 446, 470, 468, 469
See application file for complete search history.

(56) References Cited

U.S. PATENT DOCUMENTS

| | | | |
|---|---|---|---|
| 700,851 A | 5/1902 | Storm | |
| 2,463,418 A * | 3/1949 | Pescara | 123/262 |
| 2,640,422 A * | 6/1953 | Malin | 417/428 |
| 4,140,088 A * | 2/1979 | de Vulpillieres | 123/478 |
| 4,481,921 A * | 11/1984 | Tsukahara et al. | 123/304 |
| 4,543,930 A * | 10/1985 | Baker | 123/299 |
| 4,549,511 A * | 10/1985 | Grieshaber et al. | 123/263 |
| 4,590,904 A * | 5/1986 | Wannenwetsch | 123/300 |
| 4,635,600 A * | 1/1987 | Taira | 123/300 |
| 4,693,227 A * | 9/1987 | Satou | 123/575 |
| 4,787,350 A * | 11/1988 | Syassen | 123/300 |
| 5,060,610 A * | 10/1991 | Paro | 123/300 |
| 5,072,706 A * | 12/1991 | Eblen et al. | 123/299 |
| 5,353,766 A * | 10/1994 | Peters et al. | 123/450 |
| 5,365,902 A * | 11/1994 | Hsu | 123/299 |
| 5,678,521 A * | 10/1997 | Thompson et al. | 123/447 |
| 5,890,459 A * | 4/1999 | Hedrick et al. | 123/27 GE |
| 5,937,826 A * | 8/1999 | Olson et al. | 123/447 |
| 5,996,558 A | 12/1999 | Ouellette et al. | |
| 6,959,878 B1 | 11/2005 | O'Brien et al. | |
| 6,983,733 B2 * | 1/2006 | Yamashita et al. | 123/305 |
| 7,089,789 B2 | 8/2006 | Klopfer et al. | |
| 2004/0031467 A1 * | 2/2004 | Bernhardt et al. | 123/446 |

FOREIGN PATENT DOCUMENTS

| | | |
|---|---|---|
| CH | 146354 A | 4/1931 |
| DE | 727045 C | 10/1942 |
| DE | 974359 C | 12/1960 |
| DE | 4115478 A1 | 11/1991 |

* cited by examiner

*Primary Examiner*—Mahmoud Gimie

(57) ABSTRACT

An internal combustion engine includes an engine block, at least one combustion cylinder carried by the engine block, and at least one fuel injector. Each fuel injector is associated with a respective combustion cylinder. Each fuel injector includes a plurality of injector nozzles for selectively injecting fuel into a respective combustion cylinder. A single control valve is fluidly coupled with each of the plurality of injector nozzles.

10 Claims, 3 Drawing Sheets

US 7,574,992 B2

FUEL INJECTOR WITH MULTIPLE INJECTOR NOZZLES FOR AN INTERNAL COMBUSTION ENGINE

FIELD OF THE INVENTION

The present invention relates to internal combustion engines, and, more particularly, to fuel injectors for internal combustion engines.

BACKGROUND OF THE INVENTION

An internal combustion engine typically includes a plurality of combustion cylinders in which are disposed a respective plurality of pistons. It is known to provide the pistons with a head end having a contoured surface on the side of the combustion chamber in an effort to improve combustion efficiency and reduce undesirable exhaust emissions. Incomplete combustion within the combustion cylinders due to poor fuel and air mixing results in generation of soot, carbon monoxide (CO) and hydrocarbon (HC) emissions. Hot zones in the combustion mixture result in the creation of nitrogen oxide (Nox) emissions which are also undesirable. In addition to improving combustion efficiency through the design of the piston crown and timing of the fuel/air mixture, other known methods of reducing emissions include exhaust after treatment and exhaust gas recirculation (EGR) systems.

Most of the larger internal combustion (IC) engines in use today have fuel injection rather than carbureted systems to provide the fuel/air mixture to the combustion cylinders. Each fuel injector includes an integral control valve and injector nozzle which are mounted at the head end of a corresponding combustion cylinder to inject fuel into the combustion cylinder. The injector nozzle is configured with a relatively high discharge rate to provide the fuel to the combustion cylinder in a single shot for mixing with the combustion air prior to combustion on the compression stroke of the piston. Although an injector system with single injectors for each combustion cylinder has been the norm for decades, improvements are still desirable to improve the combustion efficiency and reduce exhaust emissions.

What is needed in the art is a fuel injector system for an internal combustion engine which is reliable to use, improves combustion efficiency and reduces exhaust emissions.

SUMMARY OF THE INVENTION

The invention in one aspect is directed to an internal combustion engine, including an engine block, at least one combustion cylinder carried by the engine block, and at least one fuel injector. Each fuel injector is associated with a respective combustion cylinder. Each fuel injector includes a plurality of injector nozzles for selectively injecting fuel into a respective combustion cylinder. A single control valve is fluidly coupled with each of the plurality of injector nozzles.

The invention in another aspect is directed to a method of operating a fuel injector in an internal combustion engine, including the steps of: actuating a single control valve fluidly coupled with a plurality of injector nozzles; and selectively discharging fuel from the plurality of injector nozzles into a single combustion cylinder.

DETAILED DESCRIPTION OF THE INVENTION

Figure 1:
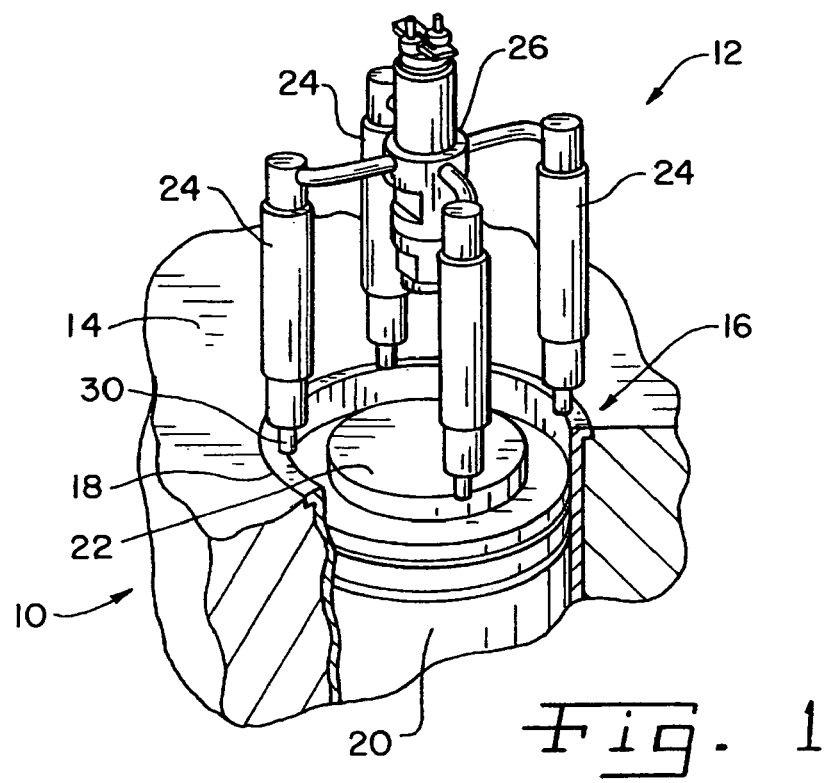
FIG. 1 is a fragmentary, perspective view of an internal combustion engine including an embodiment of a fuel injector of the present invention.
Figure 2:
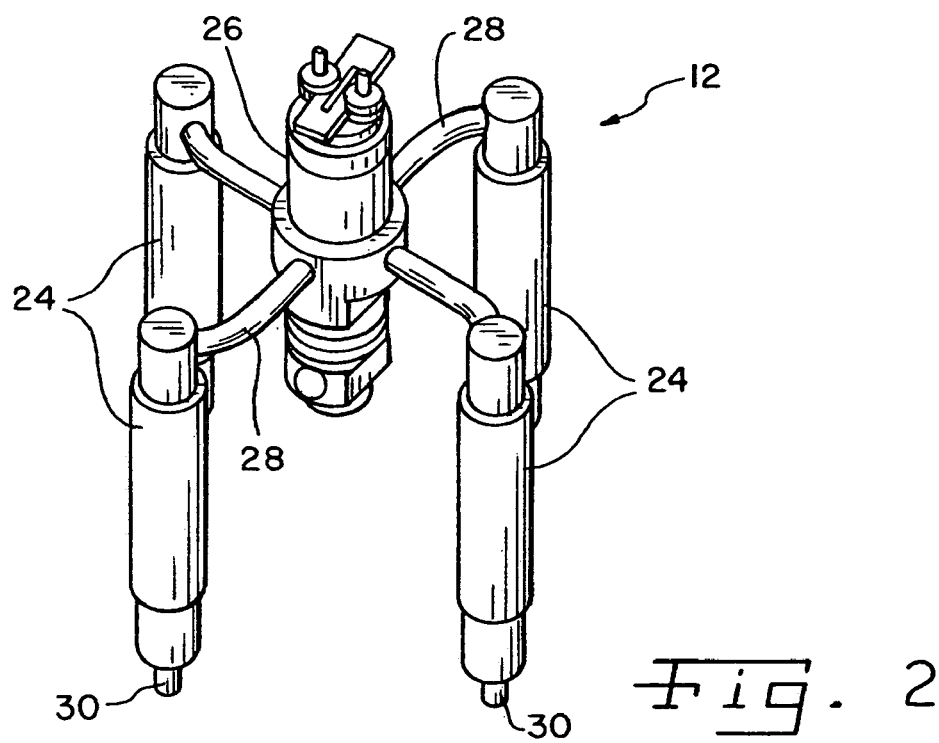
FIG. 2 is another perspective view of the fuel injector shown in FIG. 1.

Referring now to the drawings, and more particularly to FIG. 1, there is shown a perspective view of a portion of an IC engine 10, including an embodiment of a fuel injector 12 of the present invention. IC engine 10 includes an engine block 14 which typically carries a plurality of combustion cylinders 16 which are usually configured identical to each other. Only a single combustion cylinder 16 is shown in the drawings for ease of illustration, it being understood that the remaining combustion cylinders are configured the same.

Combustion cylinder 16 includes a cylinder liner 18 disposed within engine block 14. A piston 20 is reciprocally disposed within cylinder liner 18, and preferably includes a head end with a center projection 22 defining an annular crown, and thus an annular combustion space surrounding center projection 22. Piston 20 may also be differently configured, such as a piston having an annular recess at the head end, a crown shaped head end, etc. Piston 20 is typically connected via a piston rod with a crankshaft, commonly coupled with the remaining pistons of IC engine 10.

Fuel injector 12 associated with each respective combustion cylinder 16 includes a plurality of injector nozzles 24 and a single control valve 26. Conventional fuel injectors include a control valve which selectively controls the discharge of fuel from a corresponding single injector nozzle into the combustion chamber of the combustion cylinder. In contrast, the present invention includes a single control valve which selectively injects fuel from a plurality of injector nozzles into a corresponding combustion cylinder 16. To that end, single control valve 28 is fluidly coupled with four supply pipes 28, which are connected at an opposite end with a corresponding injector nozzle 24. Injector nozzles 24 are approximately evenly angularly spaced relative to each other and the annular combustion space defined by center projection 22 of piston 20. That is, injector nozzles 24 are positioned approximately 90° apart from each other about control valve 26. Other configurations are also possible, such as three injector nozzles positioned 120° apart, injector nozzles that are not evenly angularly spaced, etc.

Each injector nozzle 24 includes a nozzle tip 30 with a valve 32 which opens at a predetermined fluid pressure. Each injector nozzle 24 may be configured with a same valve 32 so that all valves 32 open at the same fluid pressure. Alternatively, injector nozzles 24 may be configured with valves which open at different fluid pressures. In the event a fuel rail system is utilized to provide fuel to fuel injectors 12, different valve opening pressure settings would help with control of small fuel quantities at low fuel delivery. Thus, some nozzle tips 30 would remain closed at low rail pressures to help with "turn down". Turn down is defined as low fuel deliveries at idle and low loads.

Figure 5:
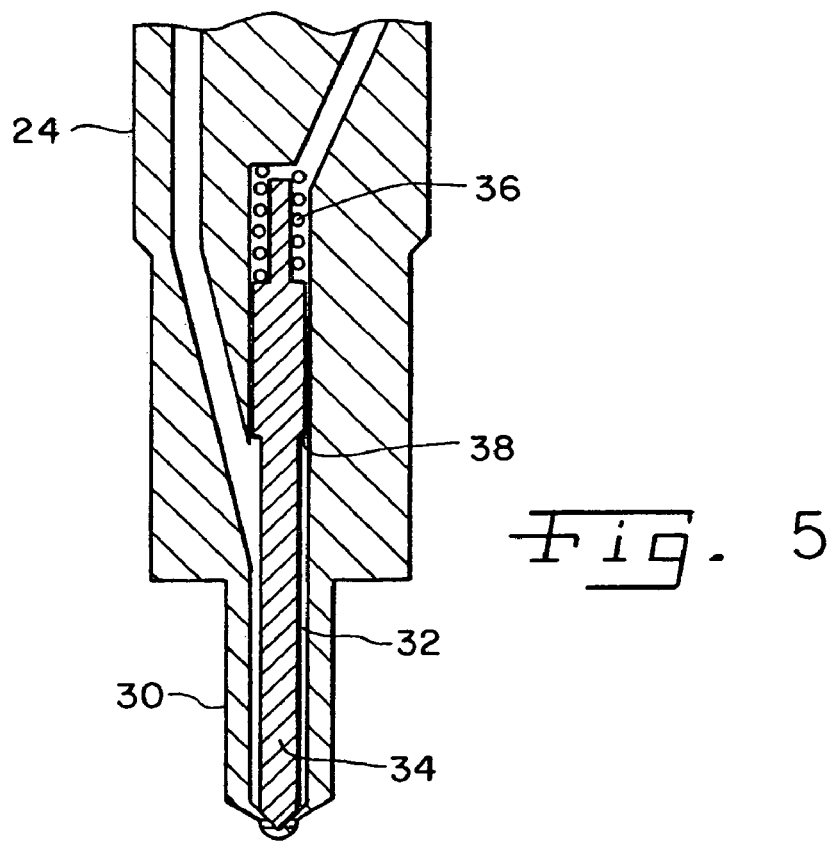
FIG. 5 is a cross sectional view through an injector tip of the fuel injector.

Valve 32 may take the form of various known valves used in association with a fuel injector nozzle, such as a pressure operated poppet valve or a spring loaded needle valve. In the embodiment shown, valves 32 are in the form of needle valves (FIG. 5) having a needle 34 positioned within a bore (not numbered) and biased to a close position by a spring 36. Fluid pressure acting on annular shoulder 38 opens needle valve 32 at a given pressure, dependent upon the spring constant of spring 36.

Figure 4:
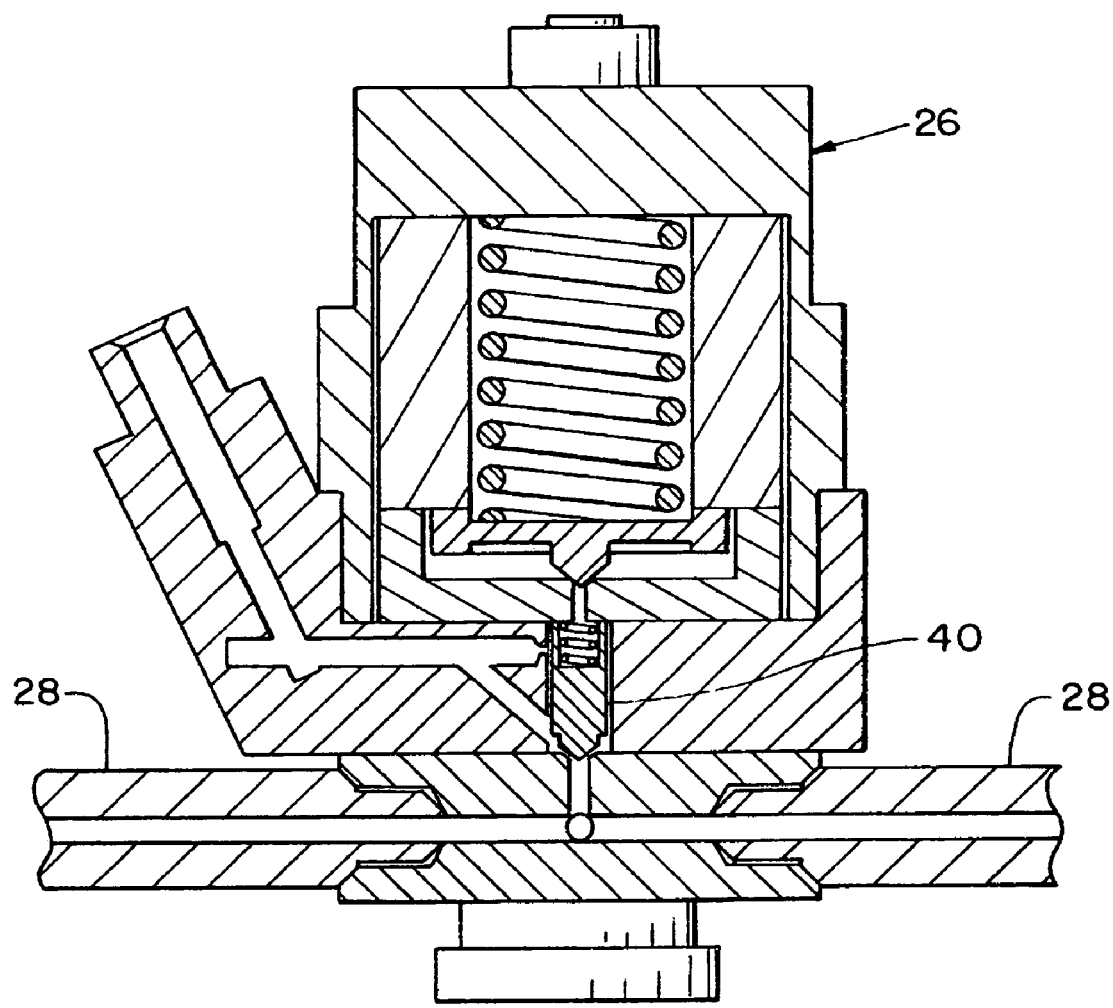
FIG. 4 is a cross sectional view through the control valve of the fuel injector.

Single control valve 26 may be configured to concurrently and substantially simultaneously provide fuel to injector nozzles 24, and the discharge from nozzle tips 30 is controlled by the pressure at which respective valves 32 open. Alternatively, control valve 26 can be configured to sequentially supply fuel to injector nozzles 24 at different points in time, such as by using stepped shoulders or surfaces, individual pistons connected to a common control shaft, etc. In the embodiment shown, control valve 26 includes a pressure operated, single piston 40 (FIG. 4) which is assumed to supply fuel concurrently to injector nozzles 24, which are also assumed to have identically configured valves 32 at nozzle tips 30 as described above.

Figure 3:
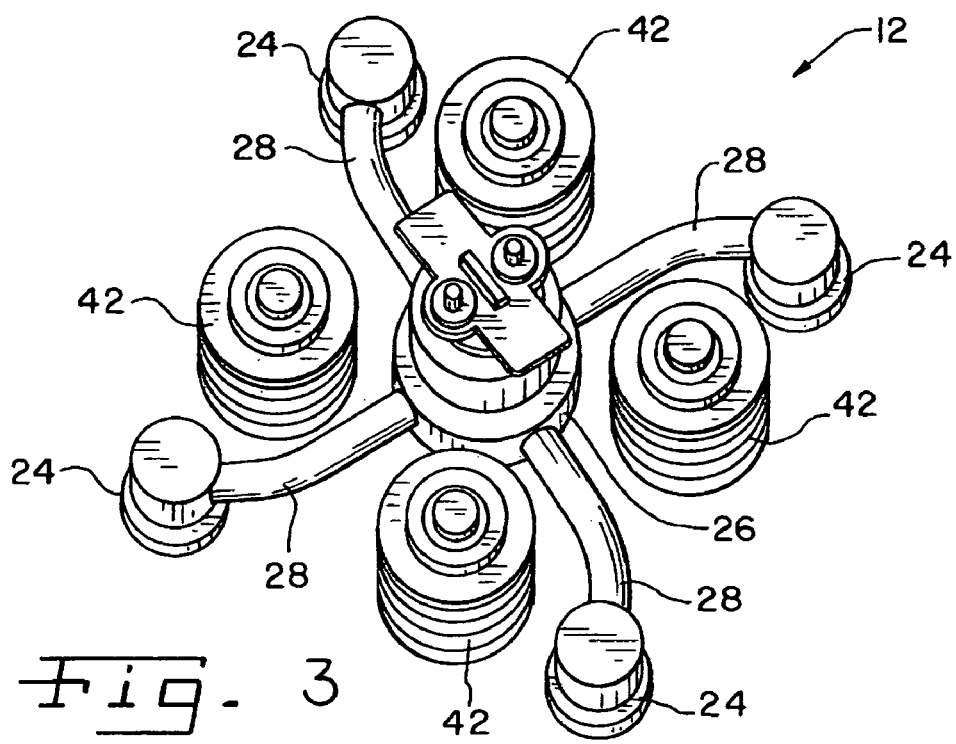
FIG. 3 is a top view of the fuel injector shown in FIGS. 1 and 2, in relation to a plurality of intake valves.

Referring to FIG. 3, each injector nozzle 24 is preferably positioned in close proximity to a respective combustion air intake valve 42. Thus, in the embodiment shown, there are four injector nozzles 24 and four intake valves 42. By positioning a greater number of injector nozzles 24 and corresponding intake valves 42 in an angularly spaced relationship relative to each other about the periphery of combustion cylinder 16, a localized fuel-to-air ratio may be provided within each combustion cylinder 16. This improves the combustion efficiency within each combustion cylinder 16, and reduces the emissions of various undesirable exhaust products.

It is also possible to provide a number of combustion air intake valves which do not correspond in number to the number of injector nozzles. For example, it is possible to provide two air intake valves which still provide a localized fuel-to-air ratio within combustion cylinder 16. The intake valves can be respectively positioned between an adjacent pair of injector nozzles. Other configurations are also possible.

During use, control valve 26 is opened to supply fuel to injector nozzles 24. Each nozzle tip 30 of a respective injector nozzle 24 is positioned radially outside of center projection 22 to discharge fuel into the annular combustion space between center projection 22 and cylinder liner 18. The nozzle tips 30 open and close in timing with air intake valves 42 to provide a localized fuel-to-air ratio within each combustion cylinder 16.

Having described the preferred embodiment, it will become apparent that various modifications can be made without departing from the scope of the invention as defined in the accompanying claims.

The invention claimed is:

1. An internal combustion engine, comprising:
   an engine block;
   at least one combustion cylinder carried by said engine block; and
   at least one fuel injector, each said fuel injector associated with a respective said combustion cylinder, each said fuel injector including:
   a plurality of injector nozzles for selectively injecting fuel into said respective combustion cylinder at spaced locations within said combustion cylinder; and
   a single control valve fluidly coupled with each of said plurality of injector nozzles and supplying a common fuel to said injectors for injection into said cylinder, each said injector nozzle including a nozzle tip with a valve at said nozzle tip, each said valve openable at a corresponding said fluid pressure and,
   at least one of said valves being openable at a pressure different than the pressure for the valves of the remaining injector nozzles.

2. The internal combustion engine of claim 1, wherein each said valve comprises one of a poppet valve and a spring-loaded needle valve.

3. The internal combustion engine of claim 1, wherein each said control valve one of concurrently and individually provides fuel to said corresponding plurality of injector nozzles.

4. The internal combustion engine of claim 1, wherein each said fuel injector includes four injector nozzles.

5. The internal combustion engine of claim 1, further including a plurality of combustion air intake valves associated with each said combustion cylinder, said plurality of intake valves associated in number to said plurality of injector nozzles, whereby a localized fuel-to-air ratio may be provided within each corresponding said combustion cylinder.

6. The internal combustion engine of claim 1, further including at least one piston, each said piston reciprocally disposed in a corresponding said combustion cylinder, each said piston including a center projection defining an annular crown, each said injector nozzle having a nozzle tip positioned radially outside said center projection and approximately evenly angularly spaced relative to each other.

7. A fuel injector for an internal combustion engine, comprising:
   a plurality of injector nozzles for selectively injecting fuel into a combustion cylinder; and
   a single control valve fluidly coupled with each of said plurality of injector nozzles and supplying a common fuel to said injectors for injection into said cylinder, each said injector nozzle including a nozzle tip with a valve at said nozzle tip, each said valve openable at a corresponding said fluid pressure and,
   at least one of said valves being openable at a pressure different than the pressure for the valves of the remaining injector nozzles.

8. The fuel injector of claim 7, wherein each said valve comprises one of a poppet valve and a spring-loaded needle valve.

9. The fuel injector of claim 7, wherein each said control valve one of concurrently and individually provides fuel to said corresponding plurality of injector nozzles.

10. The fuel injector of claim 7, wherein each said fuel injector includes four injector nozzles.

* * * * *